Figure 1:
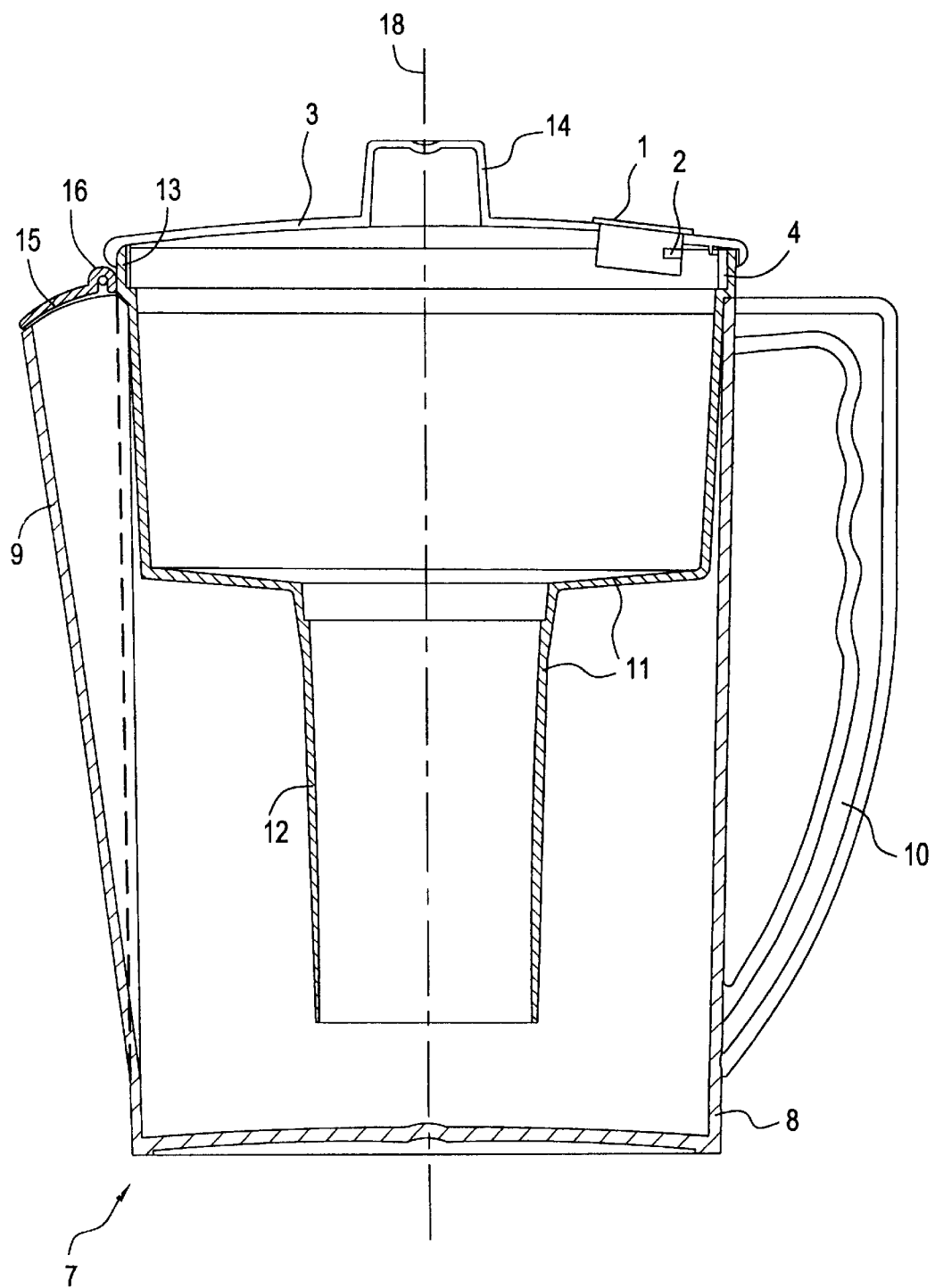

United States Patent [19]
Hofmann et al.

[11] Patent Number: 6,074,550
[45] Date of Patent: Jun. 13, 2000

[54] DEVICE FOR INDICATING THE DEPLETION OF PURIFYING AGENT

[75] Inventors: Uwe Hofmann, Heidenrod; Knut Sauerbier, Fürth, both of Germany

[73] Assignee: BRITA Wasser-Filger-Systeme GmbH, Taunusstein, Germany

[21] Appl. No.: 09/113,269

[22] Filed: Jul. 10, 1998

[30] Foreign Application Priority Data

Jul. 19, 1997 [DE] Germany ............................ 197 31 092

[51] Int. Cl.⁷ .......................... B01D 17/12; B01D 35/143
[52] U.S. Cl. .......................... 210/87; 210/138; 210/473; 222/22
[58] Field of Search ................. 210/85, 87, 94, 210/138, 482, 473, 474, 475, 477, 939; 73/861.08, 204.22, 861.78; 222/23, 36, 189.06

[56] References Cited

U.S. PATENT DOCUMENTS

| | | | |
|---|---|---|---|
| 3,960,721 | 6/1976 | Heskett ........................ | 210/25 |
| 4,986,901 | 1/1991 | Nohren, Jr. et al. ........... | 210/85 |
| 5,190,643 | 3/1993 | Duncan et al. ................ | 210/85 |
| 5,328,597 | 7/1994 | Boldt et al. ................... | 210/87 |
| 5,337,113 | 8/1994 | Kagawa et al. ............... | 354/298 |
| 5,540,107 | 7/1996 | Silverman et al. ............ | 73/861.78 |
| 5,628,895 | 5/1997 | Zucholl ......................... | 210/85 |
| 5,876,610 | 3/1999 | Clack et al. ................... | 210/739 |
| 5,888,381 | 3/1999 | Primdahl et al. .............. | 210/87 |
| 5,900,138 | 5/1999 | Moretto ........................ | 210/85 |

FOREIGN PATENT DOCUMENTS

| 0 616 975 A2 | 9/1994 | European Pat. Off. . |
|---|---|---|
| 2 257 4229 | 1/1993 | United Kingdom . |

*Primary Examiner*—Joseph W. Drodge
*Attorney, Agent, or Firm*—Michael L. Dunn

[57] ABSTRACT

A device is described for indicating the depletion of a purifying agent contained in an insert of a water purifying apparatus (7). In order to produce such a device better, to improve it technically, to construct it so as to be user-friendly and also more moderate in price, provision is made according to the invention that an indicator apparatus (1) is arranged in order to indicate to the user the depletion of the purifying agent as a function of the quantity of water which has run through the purifying agent; or alternatively to indicate to the user the depletion as a function of the quantity of water which has run through the purifying agent and as a function of time; in which preferably the indicator apparatus is connected with an arrangement which is arranged on a part (3) movable relative to the insert and which on this movement triggers a switching process.

18 Claims, 5 Drawing Sheets

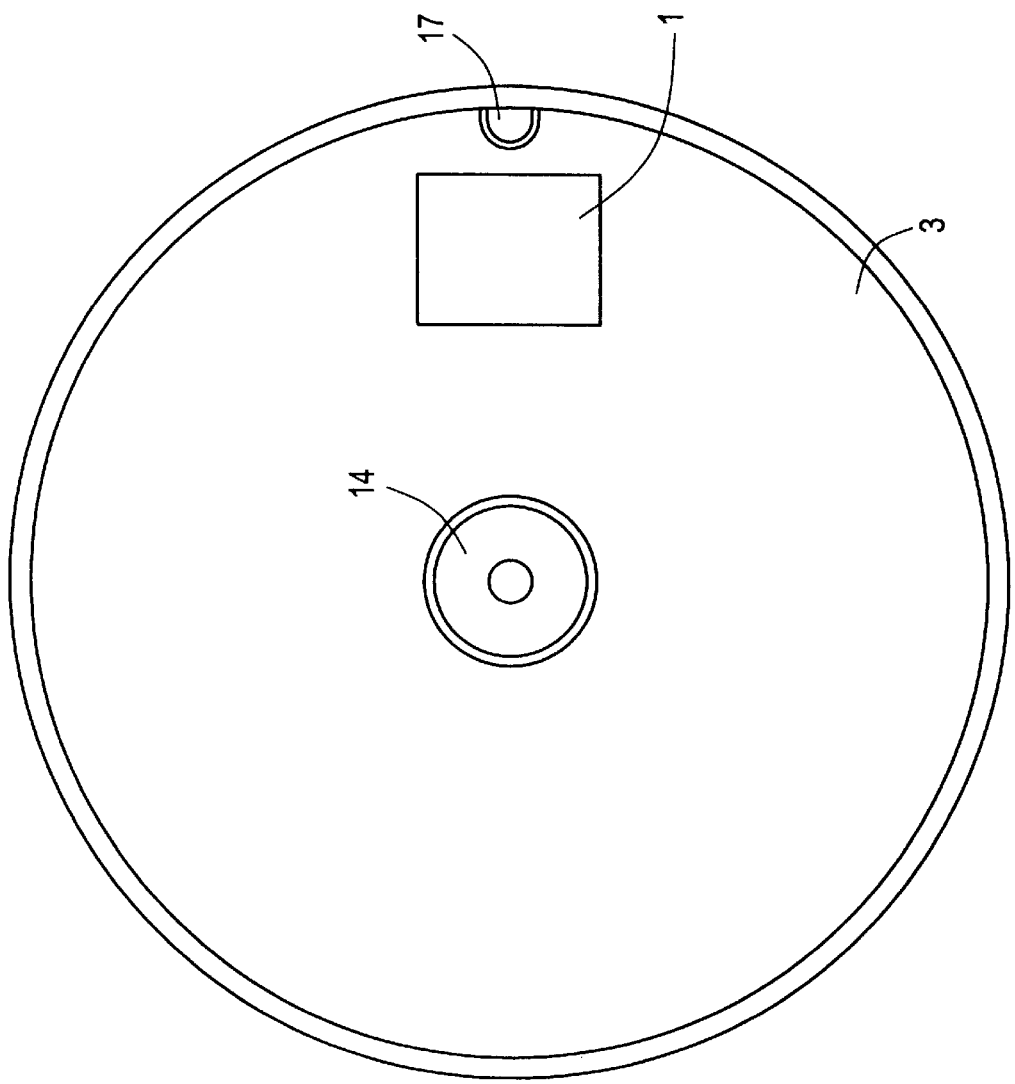

DEVICE FOR INDICATING THE DEPLETION OF PURIFYING AGENT

The invention relates to a device for indicating the depletion of a purifying agent contained in an insert of a water purifying apparatus.

The problem has already existed for a long time of measuring the depletion of purifying material in a water purifying apparatus or even indicating this as far as possible, because for a good purifying function, the purifying agent, frequently operating on the basis of ion exchange, should be regenerated or renewed from time to time. To solve this problem, chemical depletion indicators have been developed, which for example are to indicate to the user, for example through a colour change of an indicator, that the purifying agent contained in an insert is depleted. Attempts have also already been made to provide the end user with mechanical means by which he is to detect when the purifying agent in the insert or in the cartridge is depleted. Here, known water purifying devices use separate perforated discs which are able to be placed onto the insert, with for example one hole per month of a year. At the start of putting the device into use, the end user can place a marker onto a particular hole, to remind himself of the latest time when the purifying agent in the insert should be depleted. However, this was not a true indication based on a measurement.

Other manufacturers have incorporated electronic indicator devices in walls of their water purifying device and after each elapsed period of time they have provided a partial or complete depletion indication, for example by the flashing or illumination of a display field. However, it has been found that in particular cases of application in a relatively short time a large quantity of water is allowed to run through the insert. The result is that through intensive functional service the purifying agent is depleted more quickly than was estimated chronologically. Before the chronological cycle, the purifying agent is therefore already depleted through intensive use, without the desired indication occurring. Therefore, mechanical counting devices have already been created, which after respective opening and closing of the cover on the funnel of a water purifying device actuate a counter wheel, so that the end user could draw a conclusion as to the purified water quantity from the number of openings of the cover, and could exchange the purifying agent accordingly early. Such mechanical counting devices are, however, delicate, complicated and expensive.

The invention is therefore based on the problem of providing an indicator device of the type initially mentioned, which is better able to be manufactured, is improved technically, is more user-friendly and is also more moderately priced.

This problem is solved according to the invention in that an indicator apparatus is arranged in order to indicate to the user the depletion of the cleaning agent as a function of the quantity of water which has run through the purifying agent. The new indicator apparatus is no longer constructed mechanically and is therefore able to be manufactured at a more moderate price and is technically simplified, because in particular in a preferred embodiment it operates electronically. Thereby, the new indicator device is more user-friendly.

Disregarding the construction of the indicator apparatus, i.e. whether it is constructed electronically or mechanically, with a further development of the invention with the indicator apparatus one can indicate to the user the depletion of the purifying agent not only as a function of the quantity of the water which has run through but also as a function of time. This combination of measurement of time and water quantity, in order to draw conclusions therefrom as to the degree of depletion of the purifying agent, is unknown in the prior art, because the taking into account of both parameters, namely the elapsed time and the treated quantity of water does not seem possible to the user. However, this combination is successful in accordance with the invention, without too great a manufacturing expenditure.

In particular, according to the invention, one has followed the path in which the indicator apparatus is connected with an arrangement which is arranged on a part which is movable relative to the insert and on this movement triggers a switching process. Through the movement of a part which is separate from the insert (with the purifying agent) and is displaceable with respect thereto, for example through the movement of the cover, of a slider, or a filling device or the like, it is possible through the use of the arrangement according to the invention to trigger a switching process which in turn brings about an indication in the device according to the invention. Differently from mechanical interventions, which presuppose a costly manufacture with high precision and which are subject to wear, a switching process, as is known, is possible without the movement of mechanical parts; in particular, if one uses an electric arrangement which brings about an indication at the same time. As can be seen, such an indicator device is simpler, more robust and is preferred by the end user.

A further alternative embodiment of the device according to the invention is also possible in that the switching process is triggered by the movement of two different parts of the device relative to each other, in so far as their movement is necessary for releasing a filling opening. For example, a cover on a filter container could be unlocked by a bolt by turning or pushing and thereafter could be raised. If the indicator apparatus is then situated on the bolt or on the cover, the switching process could be able to be triggered by the movement of the cover or of the bolt relative to the respectively other part.

It is particularly favourable here if according to the invention, the arrangement is integrated in the indicator apparatus. The accommodating of such an indicator device is possible in a very small space and therefore differs from the mechanical devices known hitherto not only from the point of view of comfort but also fundamentally as regards the problem and also as regards the solution. The indicator apparatus is preferably an electric or electronic apparatus with chips, electric circuits, switches and the like which are known per se and are able to be produced using the smallest space.

In a very small space, there are time-dependent controls which after the elapse of particular periods of time provide partial indications and thereafter full indications, by means of which the user can detect that the purifying agent is depleted. The special factor according to the invention is that with the electronic indicator apparatus according to the invention, not only the time elapse but also—combined with this elapse—also and in addition the quantity of water which has run through the purifying agent is measured and the result thereof is indicated. This measurement in fact takes place indirectly by means of the movement of mechanical parts with respect to each other, nevertheless reliably and very precisely close to the actual water quantity. A slider was mentioned for example above as the movable part. This can, for example shut off the supply to the insert which is filled with the purifying agent or can free access after pushing back into an opened position. If one assumes a particular water quantity which after opening once, before the subsequent closing, is poured through the filled insert, for example 1 liter or alternatively 2 liters, then one can gauge the single opening of the slider with subsequent closing as the passage of a particular quantity of water. Because through this sliding process, a switching in the electronic indicator apparatus has been triggered, this switching means the passage of the particular quantity of water, which can then be indicated immediately.

All the parts in a water purifying device, which are movable with respect to the insert which is filled with purifying agent, are able to be conceived as signal emitters. Through "And" and/or "Or" circuits, the time measurement can be combined with the quantity measurement electronically in a manner known per se. This step is also used by the present invention, so that in a realistic manner, through the indicator apparatus according to the invention, the depletion of the purifying agent can be detected and even indicated as a function both of time and also of the quantity of water which has passed through.

In a preferred embodiment, provision is made according to the invention that the arrangement of the indicator apparatus has a reed switch and that a magnet is fastened to the part which is connected with the insert. The part which is connected with the insert can either belong to the housing, can for example be a funnel connected with the insert, or can alternatively also be a handle on the collecting vessel or any other corresponding part to which a magnet is able to be fastened in a comfortable and technically simple manner, which on drawing close or moving away from the reed switch can trigger the above-mentioned switching process. It is known to use reed switches having very small dimensions, if small outputs are sufficient for the desired functions. If an electrical impulse or else the indication of the field of an indicator apparatus or of a light source, for example of a LCD is concerned, very small electric outputs and very small reed switches are sufficient.

According to the invention, it is in fact assumed that the indicator apparatus with its electronic arrangement is arranged in the movable part, for example in the cover, whilst the magnet is arranged in the part which is connected with the insert. Nevertheless, the teaching according to the invention can also be used, however, when the two elements necessary for the switching are respectively exchanged. This means that the magnet is also arranged in the movable part, for example in the cover or in the slider which has already been described. It is obvious that one can also fasten the indicator apparatus to the part which is connected with the insert.

Indeed, in a preferred embodiment of the invention, it has proved to be particularly advantageous if the insert of the water purifying device is held on a funnel which is supported in a collecting vessel, on which funnel the magnet is fastened, and if the indicator apparatus is arranged on the cover of the water purifying device. The dimensions of the indicator apparatus are to be smaller than the fingertip of an adult. From this, one can already see the favourable possibilities of arranging the indicator apparatus on the part which is movable with respect to the insert, for example on the cover, whilst the magnet is arranged in the handle, in the said funnel or on another wall of the water purifying device according to the invention.

Furthermore, it is advantageous if according to the invention the magnet extends in the form of a band around the periphery of the funnel which carries the cover. This band can preferably be held free of intrusion and fastened without difficulty on the upper edge of the funnel in a recess. The advantage of the band shape lies in that then on the entire periphery of the funnel edge, a magnetic force is available which is necessary for switching, with the result that one can place a cover, not secured with respect to twisting, in any desired angular position onto the funnel edge, with the result that the reciprocal effect between the magnet and the indicator apparatus takes place reliably and independent of rotation at any time and with the cover in place. Instead of the magnet in the form of a band or strip, possibly also of a cable, one can just as well arrange a ring of individual magnets on the funnel and achieve the same advantages as with the use of a band or strip form of the magnet.

If in another preferred and alternative embodiment, one gives the magnet the shape of a bolt, small sheet or parallelepiped, one can dispense with the band shape and hence the use of a larger quantity of magnet material, if one makes provision according to the invention that the cover and/or the funnel then has a centering means, for example knubs, a groove-and-tongue joint, projections which interact with recesses etc. Frequently, the collecting vessel has a pouring spout, and if steps are taken on the cover for the fitting of a cover point with the pouring spout, automatically a centering of the cover is provided. The indicator apparatus can then be arranged for example opposite the pouring spout in the vicinity of the handle of the collecting vessel. The magnet in the form of a parallelepiped or bolt can then be arranged for example in the handle, in the outer wall of the collecting vessel, in the edge region of the funnel or on another wall connected with the insert.

The shape and size of the magnet changes according to the distance between the indicator apparatus or its reed switch and the magnet. Larger magnets permit the arrangement of the indicator apparatus at a greater distance from the magnet and vice versa. If one increases the zero distance, i.e. the distance at which the state of rest of the reed switch exists, the small plates or switching tongues of the reed switch move into the respectively other position (switching process), so that thereby the electrical impulse is available in the electronic indicator apparatus, in order to carry out a count and to also indicate this.

A preferred embodiment of the invention is characterised in that with the cover placed on the water purifying device, the magnet has a distance of 1 mm to 30 mm from the reed switch, preferably 5 mm to 10 mm. In these orders of magnitude, the most favourably priced and technically most expedient to handle parts can be incorporated, connected and used.

Here, according to the invention, one can additionally use an indicator apparatus which has a window shield with several display fields arranged adjacent to each other and preferably with a reset button. Before putting the indicator arrangement of the invention into operation, energy can be saved as long as the apparatus is for example in a warehouse, unsold. After purchase, the user can activate the indicator apparatus by actuating the reset button and the desired functions can be pursued by observing the display fields. Through a transparent sheet, a plate, a panel or the like as window shield, one or more display fields are the information carriers, when they are visible, flash or are invisible. Instead of display fields, digital light emitting diodes can also be used. The individual elements of the device according to the invention are advantageously adapted to the form of the respective water purifying apparatus. The time units and/or units for, for example, water quantities allowed to run through the insert with the purifying agent, can be set to days, weeks, months or years or number of liters of liquid, according to the wishes of the user and the purpose of use.

Figure 2:
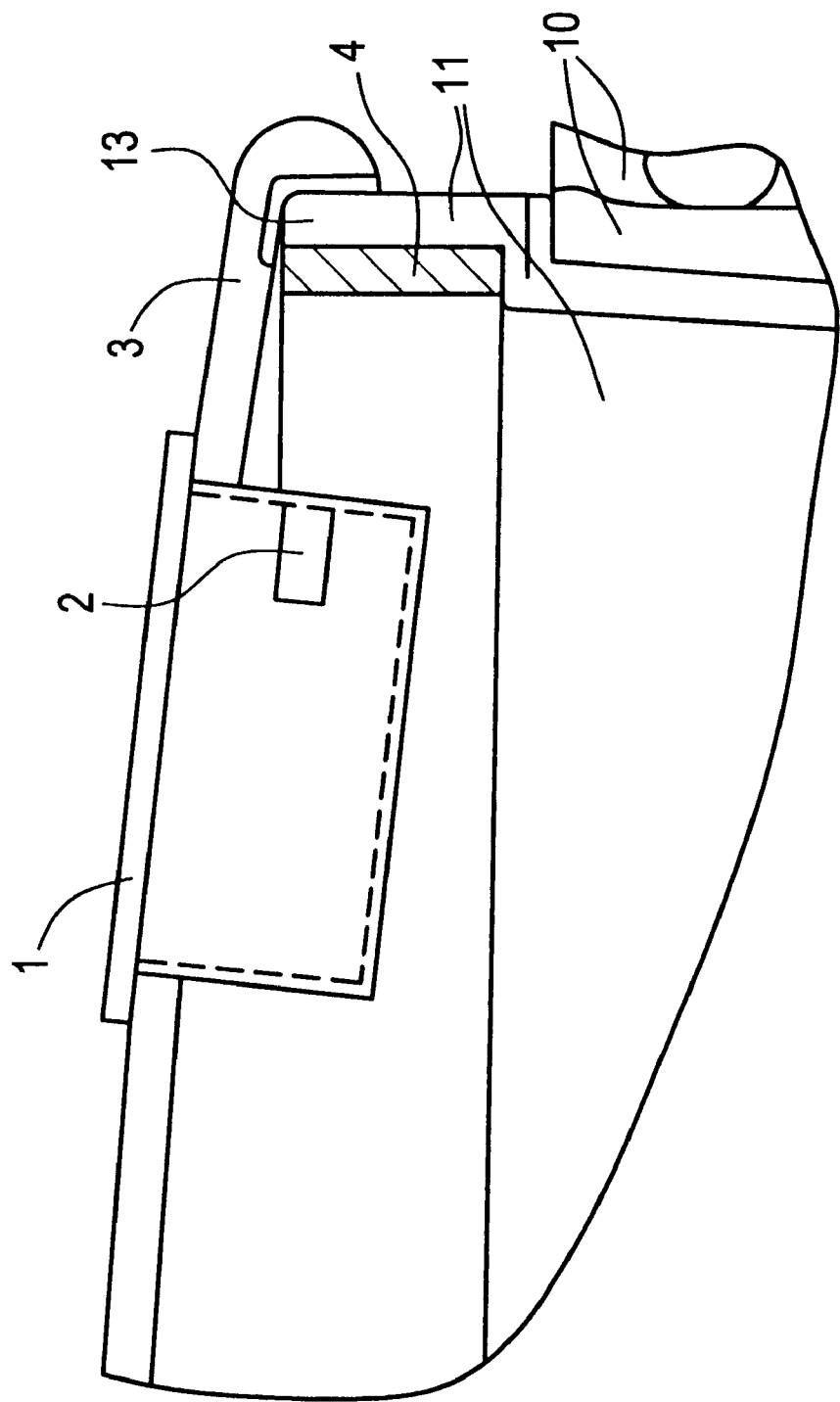
Figure 3:
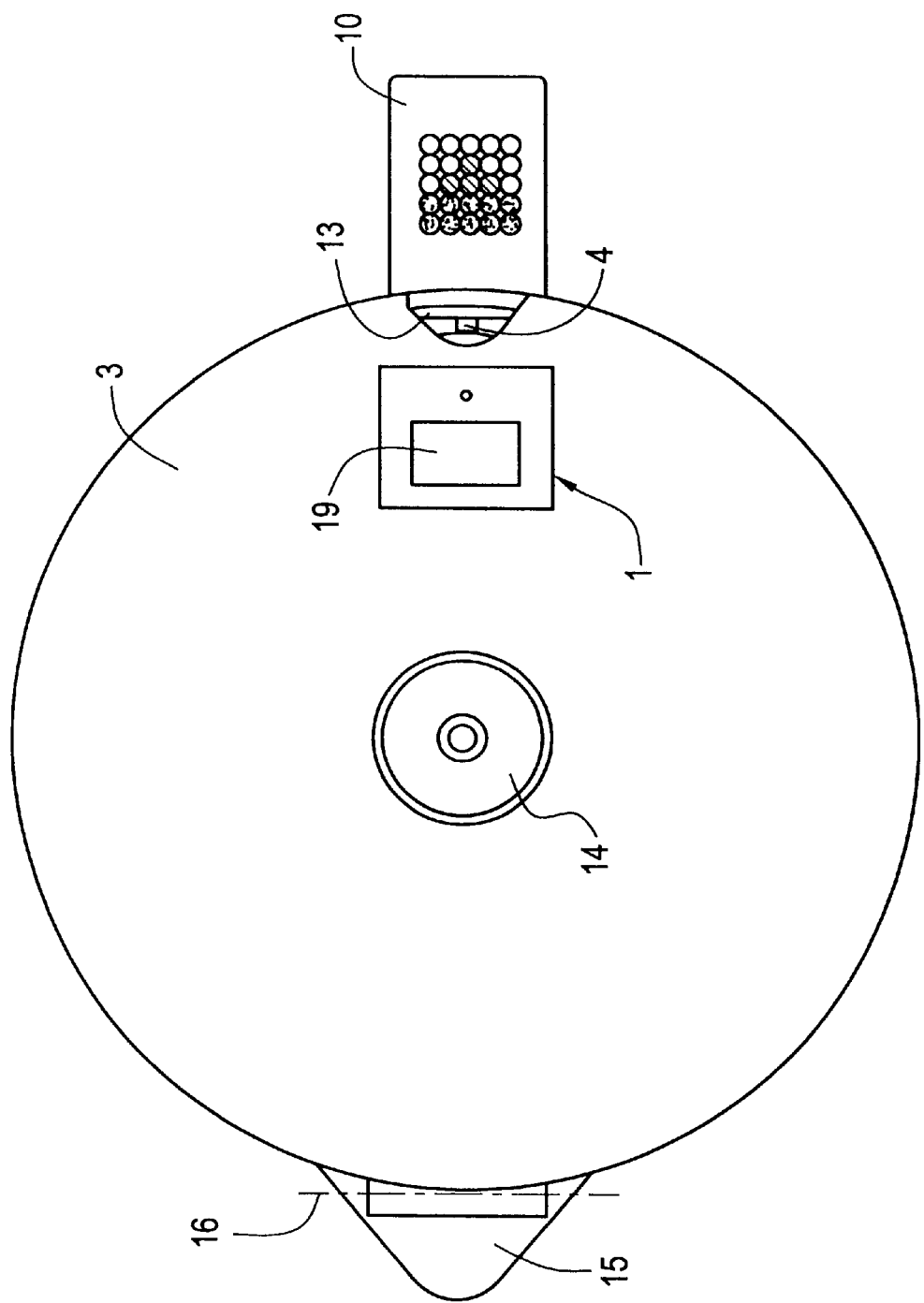
Figure 4:
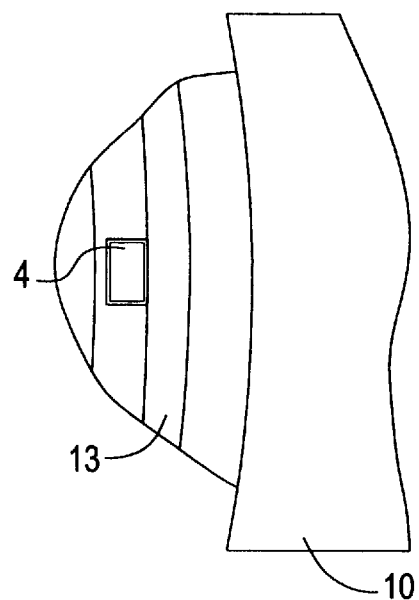
Figure 5:
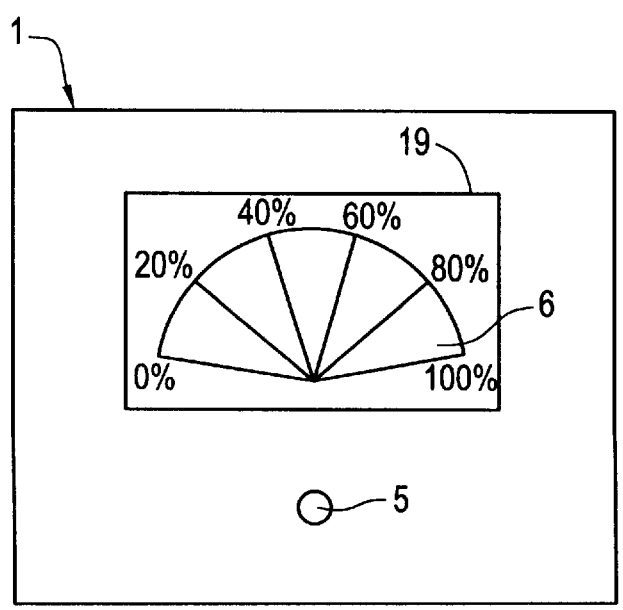

Further advantages, features and possibilities of use of the present invention become apparent from the following description of a preferred example embodiment in connection with the attached drawings, in which:

FIG. 1 shows in cross-section a water purifying device with cover and with a funnel covered therewith, FIG. 2 shows a broken and enlarged detail of the water purifying device of FIG. 1 in the region of the cover and of the funnel edge at the top right, FIG. 3 shows a top view onto the water purifying device of FIG. 1, viewed from above onto the cover and onto the handle, FIG. 4 shows on an enlarged scale the detail of FIG. 3, which is illustrated broken adjacent to the handle, left, FIG. 5 shows a top view onto the indicator apparatus which is enlarged and drawn more precisely, and FIG. 6 shows a top view onto the cover from below, when the funnel and the water collecting vessel are omitted.

The water purifying device generally designated by 7 consists of a water collecting vessel 8 with pouring spout 9 at the front end and handle 10 at the rear end.

Inside the water collecting vessel 8, from above a funnel generally designated by 11 is inserted, which has a sleeve 12 towards the centre bottom, into which an insert with purifying agent can be inserted, which is not drawn in further detail here. The latter is provided above and below with a perforated base, so that purifying agent in granulated form can be accommodated therein. The insert has approximately the size of the sleeve 12, although its upper base can also project slightly into the upper widened part of the funnel 11. On the edge 13 of the funnel 11, a cover 3 which closes the entire funnel 11 is placed so as to be removable. It overlaps the upper edge 13 of the funnel 11 and is in the shape of a circular ring with a gripper knob 14 arranged in the centre.

The pouring spout 9 which is constructed in one piece with the water collecting vessel 8 is covered by a freely swivellable flap 15, the swivel axis 16 of which is illustrated in FIG. 1 at the top left as an intersection point and in FIG. 3 as a dotted line.

In the cover 3, on one side eccentrically radially at a distance from the gripper knob 14, an indicator apparatus 1 is arranged, which for example has a parallelepiped housing with an upper wall overlapping this, so that the indicator apparatus 1, in the embodiment shown here, is inserted from the exterior in a recess in the cover and is secured in this position, for example by clamping, gluing and the like, so that with a view of the cover 3 from the inside according to FIG. 6, one looks onto the base of the box-shaped indicator apparatus 1.

A reed switch 2 is accommodated on a side wall in the indicator apparatus 1, as indicated in FIG. 2. The nearest part of the upper edge 13 of the funnel 11 is situated approximately at a distance of 10 mm next to the reed switch 2.

In a first embodiment according to FIGS. 3, 4 and 6, the cover 3 is provided with a centering 17, so that the cover 3 can only be placed in such a position on the edge 13 of the funnel 11 that the distance between the reed switch 2 of the indicator apparatus 1 and a bar-shaped magnet 4 is minimal, for example 7 to 10 mm. This bar-shaped magnet 4 can be seen in FIGS. 2 to 4. It is secured on the lower shoulder of the funnel 11 near its edge 13.

In another embodiment, which can be seen here in FIGS. 1 and 2, the magnet 4 has the form of a band and extends over the entire periphery next to the edge 13 of the funnel 11. In this embodiment, a centering is not necessary, because the distance between the indicator apparatus 1 or its reed switch 2 on the one hand and the magnet band 4 on the other hand is always the same as one also turns the funnel 11 or the cover 3 about the central axis 18 with respect to each other.

If one looks from above onto the cover 3, one sees radially at a distance from the gripper knob 14 the indicator apparatus 1, as can be seen in FIGS. 3 and 5. In a rectangular window shield 19, one sees five segment-like display fields 6, each of which shows a portion of 20% of a total 100%. Each display field 6 is to be made visible separately from the other. For example, the window shield 19 can appear empty or one or more display fields can appear simultaneously or flash.

Under the window shield 19, a reset button 5 can be seen, which can be actuated by a pointed tool, such as a ballpoint pen tip, for example.

In a specific embodiment of the invention, a chip has been incorporated in the electronic indicator apparatus 1, in which chip the manufacturer has preset a quantity of 140 liters of water, assuming that the volume of the funnel 11 or of the water collecting vessel 8 amounts to 1 liter. (It is obvious here that also other liter indications can be provided in the display, which are then adapted to a different funnel volume).

In the chip in addition, for each segment-like display field 6, a particular time period, here in the example 11 days, are preset, which correspond to 20% of depletion. After 55 days, all the display fields would be visible.

On purchasing a water purifying device with 1 liter volume, it is assumed that the insert, filled with purifying agent, is depleted either after 55 days or after 140 liters water have passed through.

In order to set the apparatus into operation, the reset button is actuated. Then the digital display is activated. All five segment-like display fields appear for one second behind the window shield 19. After these are extinguished, the display "0%" appears bottom left in FIG. 5. This indicates to the customer that the display has been activated successfully. Then the end user is shown top right in the display by a continuous flashing signal that the apparatus is activated.

If only the time is measured, because the apparatus for example is only charged with small quantities of liquid, then after 11 days the first segment appears with the depletion indication of 20%. After 22 days, the second segment appears plus the first segment, so that in total a depletion of 40% is indicated. After 55 days have elapsed, accordingly all five segment-like display fields appear with the indication of 100%. In addition, provision is made here that 5.5 days before reaching the last time threshold, i.e. before reaching the 55 days, the last segment arranged furthest to the right in FIG. 4 begins to flash. This segment flashes until the 55 days have been reached. Then the display "100%" appears at the bottom right. At the same time, all five segment-like display fields flash until the customer re-activates the display again and previously according to the manufacturer's recommendations has carried out the exchange of the insert for a new purifying agent.

If, vice versa, one considers an operation in which a large quantity of water flows through the purifying device in the shortest period of time, so that a measurement of the water quantity is to the fore, then likewise the segment-like display fields appear in succession. However, the switching process by the reed switch 2 is crucial for their appearance. This is achieved by changing the distance of the reed switch from the magnet 4. These may be round magnets with a diameter of 3 to 5 mm, a small sheet form with a length of 10 mm and a thickness of 1 mm or a band form, as already described above. The best switching results have occurred in a preferred embodiment with a magnet band when the magnet has a distance from the reed switch to the extent of 5 mm to 10 mm. The greater this distance becomes, the larger the magnet should then be.

To fill the funnel 11 with water which is to be purified, the cover 3 is removed. This results in an increasing of the distance between the magnet 4 and the reed switch 2. After subsequent placing of the cover, by definition 1 liter water is counted. If 28 liters have been counted in this way, then the first segment-like display field appears and indicates "20%". Progressively then one segment appears after the other, until 140 liters have been measured and then "100%" is indicated.

Generally, however, the time on the one hand and the filling quantity of water on the other hand are measured in combination. If in this mixed example, for example within 11 days only 25 liters water have been filtered instead of 28 liters, then the first segment appears (after the pure time counting). Internally, however, the 25 liters continue to be counted in the apparatus. The next segment-like display field appears when either in turn a period of 11 days has elapsed or the first quantity unit is filled. With a run-through quantity of for example 140 liters, with a division into five segments, the result is that one segment corresponds to 28 liters of water.

If, however, within 9 days 32 liters of water are filtered instead of 28 liters, then likewise again a segment-like display field appears, although the first time unit of 11 days has not yet been reached. In this case, the volume counting was preferred to the time counting.

At the latest after 55 days or at the latest after 140 liters, depending on which counting is completed first, all the display fields flash in the described manner.

The triggering of the respective switching process can be achieved by various means. Thus, as an alternative to a magnet with a reed switch, it is possible for example to arrange a photoelectric cell on the cover or on a part fastened to the cover, such that by the removal of the cover 3 from the upper edge 13 of the funnel 11, light strikes onto the photoelectric cell (its surface is illuminated more brightly), so that after a particular time delay, when the cover is closed again, the switching process is triggered.

In FIG. 2 one can visualize the arrangement of the photoelectric cell instead of the reed switch shown there, in which the magnet 4 according to FIG. 2 becomes superfluous. The arrangement of the photoelectric cell can be integrated in the indicator apparatus. Alternatively, the photoelectric cell can be arranged at a desired site in the cover, for example in the handle, on the upper face of the cover 3. In this way, one can also use a round cover, and the switching- and counting function operates reliably and independently of a particular alignment of the cover with respect to the funnel 11. For example, 1 second has been provided as the particular time delay. Through a delay switching arrangement, this particular time can also, however, be increased ten times. In operation, this means that the photoelectric cell is irradiated brightly after the cover 3 is opened. When the cover is then closed again in a particular, preset time, the switching process is triggered.

LIST OF REFERENCE NUMBERS 1. indicator apparatus
2. reed switch
3. cover
4. magnet
5. reset button
6. display field
7. water purifying apparatus
8. water collecting vessel
9. pouring spout
10. handle
11. funnel
12. sleeve
13. funnel edge
14. gripper knob
15. flap
16. swivel axis
17. centering means
18. central axis
19. window shield

What is claimed is:

1. A water purifying apparatus comprising a device for indicating the depletion of a purifying agent contained in an insert of the water purifying apparatus (7), which apparatus comprises a funnel (11) located inside and being supported in a collecting vessel (8) with the insert held in the funnel (11) and which purifying apparatus (7) is mobile and independent of fixed water tubes respectively, and which purifying apparatus (7) is gravity driven, wherein the device includes an indicator apparatus (1) arranged in order to indicate the depletion of the purifying agent as a function of both the quantity of the water which has run through the purifying agent and of time.

2. The water purifying apparatus according to claim 1, wherein the indicator apparatus (1) is connected with an arrangement on a part (3) movable relative to the insert and which on this movement triggers a switching process.

3. The water purifying apparatus according to claim 2, wherein the arrangement is integrated in the indicator device (1).

4. The water purifying apparatus according to claim 3, wherein the arrangement has a reed switch (2) and a magnet (4) is fastened to the part (3) which is movable relative to the insert.

5. The water purifying apparatus according to claim 4, wherein the insert of the water purifying apparatus (7) is held on a funnel (11) which is supported in a collecting vessel (8), on which funnel (11) the magnet (4) is secured, and the indicator apparatus (1) is arranged on a cover (3) of the water purifying apparatus (7).

6. The water purifying apparatus according to claim 5, wherein the cover (3) is on the funnel (11) and the magnet (4) extends in the form of a band around the periphery of the funnel (11).

7. The water purifying apparatus according to claim 2, wherein the arrangement has a reed switch (2) and a magnet (4) is fastened to the part (3) which is movable relative to the insert.

8. The water purifying apparatus according to claim 7, wherein the insert of the water purifying apparatus (7) is held on a funnel (11) which is supported in a collecting vessel (8), on which funnel (11) the magnet (4) is secured, and the indicator apparatus (1) is arranged on a cover (3) of the water purifying apparatus (7).

9. The water purifying apparatus according to claim 8, wherein one of the cover (3) and the funnel (11) has a centering means (17) for positioning the cover (3) on funnel (11) and the magnet (4) has the form of a bolt, plate or parallelpiped.

10. The water purifying apparatus according to claim 9, wherein the indicator apparatus (1) has a window shield (19) with several display fields (5) arranged adjacent to each other.

11. The water purifying apparatus according to claim 7, wherein with the cover (3) placed on the water purifying apparatus (7), there is a distance of 1 mm to 30 mm between the magnet (4) and the reed switch (2).

12. The water purifying apparatus according to claim 1, wherein the indicator apparatus (1) is turbine free and is connected with an arrangement on a part (3) movable relative to the insert and which on this movement triggers a switching process.

13. The water purifying apparatus according to claim 12, wherein the arrangement is integrated in the indicator apparatus (1).

14. The water purifying apparatus according to claim 12, wherein the arrangement has a reed switch (2) and a magnet (4) is fastened to the part (3) which is movable relative to the insert.

15. The water purifying apparatus according to claim 14, wherein the insert of the water purifying apparatus (7) is held on a funnel (11) which is supported in a collecting vessel (8), on which funnel (11) the magnet (4) is secured, and the indicator apparatus (1) is arranged on a cover (3) of the water purifying apparatus (7).

16. The water purifying apparatus according to claim 15, wherein the cover (3) is on the funnel (11) and the magnet (4) extends in the form of a band around the periphery of the funnel (11).

17. The water purifying apparatus according to claim 1, wherein the indicator apparatus (1) has a window shield (19) with several display fields (5) arranged adjacent to each other.

18. A water purifying apparatus comprising a device for indicating the depletion of a purifying agent contained in an insert of the water purifying apparatus (7), which apparatus comprises a funnel (11) located inside and being supported in a collecting vessel (8) with the insert held in the funnel (11) and which purifying apparatus (7) is mobile and independent of fixed water tubes respectively, and which purifying apparatus (7) is gravity driven, wherein the device includes an indicator apparatus (1) arranged in order to indicate the depletion of the purifying agent as a function of both the quantity of the water which has run through the purifying agent and of time, wherein the indicator apparatus (1) is connected with an arrangement on a cover (3) movable relative to the insert and which on this movement triggers a switching process; wherein the arrangement has a reed switch (2) and a magnet (4) fastened to the cover (3) which is connected to the insert; wherein the insert of the water purifying apparatus (7) is held on a funnel (11) which is supported in a collecting vessel (8), the cover (3) is on the funnel (11) and the magnet (4) extends in the form of a band around the periphery of the funnel (11).

* * * * *